United States Patent [19]

Torii et al.

[11] Patent Number: 4,832,477
[45] Date of Patent: May 23, 1989

[54] DOOR MIRROR ASSEMBLY FOR AUTOMOTIVE VEHICLES

[75] Inventors: Nozomu Torii, Hekinan; Keiji Mori, Kariya; Hidekazu Kogita, Toyota, all of Japan

[73] Assignee: Aisin Seiki Kabushiki Kaisha, Japan

[21] Appl. No.: 94,546

[22] Filed: Sep. 9, 1987

[30] Foreign Application Priority Data

| Sep. 30, 1986 [JP] | Japan | 61-231934 |
| Sep. 30, 1986 [JP] | Japan | 61-231935 |
| Sep. 30, 1986 [JP] | Japan | 61-231938 |
| Sep. 30, 1986 [JP] | Japan | 61-231939 |

[51] Int. Cl.$^4$ .......................... B60R 1/06; G02B 7/18
[52] U.S. Cl. .................. 350/637; 248/478; 248/900; 350/604
[58] Field of Search ............ 350/637, 632, 604, 634, 350/633; 248/478, 479, 472, 900, 549, 483

[56] References Cited

U.S. PATENT DOCUMENTS

| 4,626,083 | 12/1986 | Nakayama et al. | 350/604 |
| 4,626,084 | 12/1986 | Kumai | 350/604 |
| 4,692,000 | 8/1987 | Wada et al. | 350/637 |
| 4,699,024 | 10/1987 | Iida et al. | |

FOREIGN PATENT DOCUMENTS

| 148737 | 8/1985 | Japan | 350/637 |
| 60-151142 | 8/1985 | Japan. | |
| 62-56455 | 4/1987 | Japan. | |

*Primary Examiner*—Jon W. Henry
*Attorney, Agent, or Firm*—Finnegan, Henderson, Farabow, Garrett & Dunner

[57] ABSTRACT

A door mirror assembly for automobiles having a vehicle side member which includes a strut, a lower case supported about the strut, an upper case fixed to the lower case, reduction gears and a motor accommodated in a space inside both cases, a driving gear which meshes with a final gear of the reduction gears and which is held around the strut, and a spring which urges the driving gear upwards and the lower case downwards. The lower case is supported on a lower part of the strut, while the upper case is supported about an upper part of the strut, and a shaft is disposed by the side of the strut and in parallel therewith and has its ends supported by the lower and upper cases.

13 Claims, 10 Drawing Sheets

DOOR MIRROR ASSEMBLY FOR AUTOMOTIVE VEHICLES

BACKGROUND OF THE INVENTION

1. Field of the Invention

The present invention relates to a door mirror assembly for automotive vehicles. More particularly, the invention relates to improvements in the support relationship between a mirror body side member of the mirror assembly and a strut formed in the vehicle side member thereof.

2. Description of the Prior Art

A door mirror, assembly for automotive vehicles has a case rotatably supported on the strut of a vehicle side member and a mirror body fixed to the case. The construction will be explained more concretely with reference to FIG. 10 showing an example disclosed in the specification of Japanese Utility Model Application Laid-Open (KOKAI) No. 60-179545. A lower case 3 is rotably supported on a strut 2 of a vehicle side member 1. The lower case 3 is integrally formed with a frame 5 on which a mirror control actuator unit can be mounted, while an upper case 4 is fixed to the lower case 3. A mirror body 6 is fixed to the cases 3, 4 and the frame 5. Arranged in the upper case 4 are a motor 7 and reduction gears 8, a final gear 9 of which is held in meshing engagement with a driving gear 10 supported on the strut 2. The driving gear 10 is connected to a torque limiter 12 subjected to the biasing force of a spring 11, one end of which is seated on the inner wall of the lower case 3. When a large external force acts on the mirror body 6, the torque limiter 12 slides. Therefore, the position of the mirror body 6 can be manually changed.

The motor 7 rotates when energized. The rotation of the output shaft of the motor 7 rotates the final gear 9 after being decelerated by the reduction gears 8. The rotation of the final gear 9 attempts to rotate the driving gear 10 meshing with this final gear. However, since the driving gear 10 is held fixed on the strut 2 by the torque limiter 12, the gear 10 is not rotated and the final gear 9 revolves around it. As a result, the cases 3, 4, frame 5 and body 6 turn about the strut 2 in unison. The mirror body 6 can be tilted in the lateral and vertical directions by the actuator unit disposed in the frame 5, but the tilting operation need not be described here.

A ball 13 is embraced by the vehicle side member 1 and the lower case 3 and is effective for positioning the lower case 3 relative to the vehicle side member 1 and for obtaining smooth motion.

The prior-art assembly has a first problem described hereinbelow. Specifically, as seen in FIG. 10, the holding length $L_1$ of the lower case 3 for the strut 2 is small. Therefore, the image in the mirror is likely to move due to vibration caused by air while the vehicle is traveling at high speed or to vibration caused by traveling on a bad road. Moreover, in the event that an overload acts in the turning direction or vertical direction of the mirror body, stresses concentrate in the bearing portion of the lower case 3 of strut 2, as a result of which this portion is damaged.

In particular, in a door mirror assembly as shown in FIG. 1 in which a space A for preventing noise caused by wind is provided between a vehicle side member 21 and a mirror body 28, the axis of the mirror is likely to shift to the right as viewed in the figure, thereby aggravating the aforementioned drawbacks.

The second problem of the prior-art assembly is as follows: In recent mirror assemblies, the space indicated at A in FIG. 1 is provided for the purpose of reducing air resistance and noise caused by the mirror assembly cutting through the air when the vehicle is traveling. However, the provision of the space A decreases the mounting space inside the mirror body 28. Inevitably, it causes the strut, reduction gears and mirror actuator to be moved to sideward outer positions and brings the position of the center of gravity of the assembly sideward, farther from the vehicle side member 21. Accordingly, an external force acting on the mirror assembly exerts a greater load on the holding portion between the case and the strut of the vehicle side member and is likely to damage this portion.

The third problem of the prior-ar assembly is as follows: When the mirror body 6 is turned manually or by the motor 7 in the prior-art example shown in FIG. 10, the lower case 3 is moved relative to the vehicle side member 1 through the nodal ball 13. The lower case 3 moves up and down until the ball enters the next nodal hole. That is, while the ball is being transferred from one nodal hole to the next, the mirror assembly moves vertically. Of course, the vertical motion is resiliently absorbed by the spring 11 so that the mirror assembly will not rattle. However, a clearance is required in the height direction of the mirror assembly to allow the vertical motion, so that an object cannot be disposed in the vicinity of the mirror assembly.

SUMMARY OF THE INVENTION

In order to solve the first problem stated above, the present invention introduces a technical idea in which rather than disposing a motor and reduction gears above a strut, the top wall of an upper case is extended above the strut. In order to realize this technical idea, the present invention adopts an expedient in which a lower case is supported on a lower part of the strut of a vehicle side member, while the upper case is supported on the upper part of the strut, and in which the motor and the reduction gears are arranged in a space defined between both cases. Further, the present invention adopts an expedient in which a shaft is disposed by the side of the strut and in parallel therewith, both ends of the shaft are supported by the lower and upper cases, and the reduction gears are assembled on this shaft.

Due to these expedients, the supporting length $L_2$ between the strut and the case assembly can be set to a large value, as illustrated in FIG. 1. In consequence, an external force acting on the mirror body does not produce stress concentration in the holding portion between the case assembly and the strut, but can be dispersed widely along in the strut.

The inventor has noticed that the second problem stated above is attributed to the fact that, since a compression spring is arranged around the strut, the spring always extends to the side of the strut by an amount corresponding to the radius thereof. In other words, the present invention has been perfected taking note of the fact that, by improving the installation of the spring, the sideward external protrusion of the mirror assembly can be reduced to the extent of at least the radius of the spring in the prior art. More specifically, the present invention adopts an expedient in which at least three springs are disposed at equiangular intervals around a strut, and in which a line connecting the axes of two of the springs is made substantially orthogonal to a line connecting the axes of the strut and reduction gears.

As a result, no spring lies on a sideward outer part of the strut. This makes it possible to arrange the reduction gears nearer the strut and to bring the center of gravity of the mirror assembly closer to the vehicle side member.

In order to solve the third problem stated above, the present invention introduces an arrangement in which only a ball is allowed to move up and down relative to the case. I embodying this idea, the present invention adopts an expedient in which the lower end of a spring is seated on a lower part of the upper case side of the case, while the ball is seated on the upper end of the spring and is pressed against a cam plate fixed to an upper part of the strut, whereby only the ball is allowed to move up and down relative to the cam plate when the case turns.

When the ball transfers from one nodal hole to the next, it moves up and down relative to the cam plate. However, since the ball is pressed against the cam plate by the spring, the up-and-down motion is directly absorbed by the spring without vertically moving the case.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
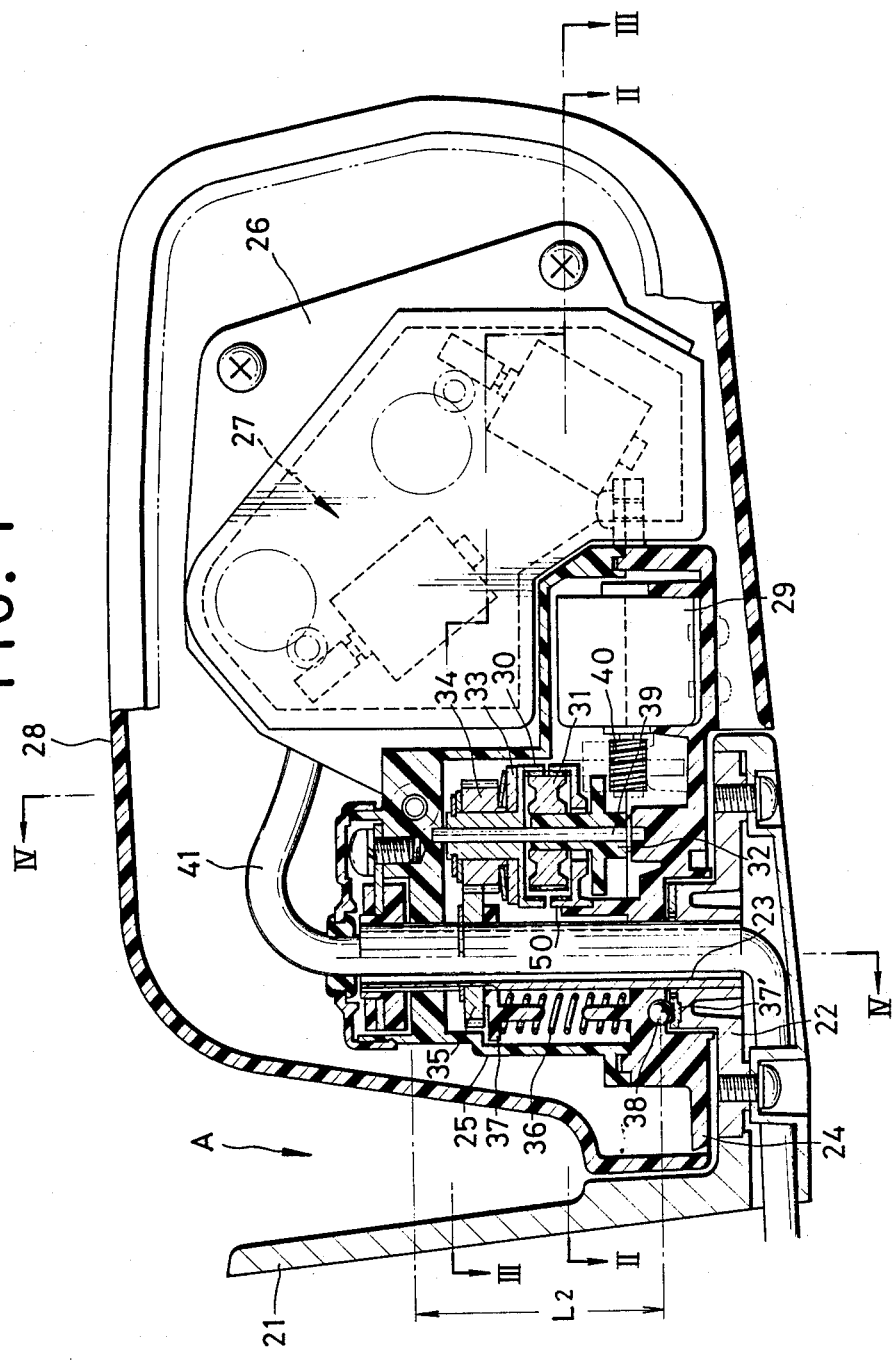
FIG. 1 is a sectional view of an embodiment of the present invention.
Figure 2:
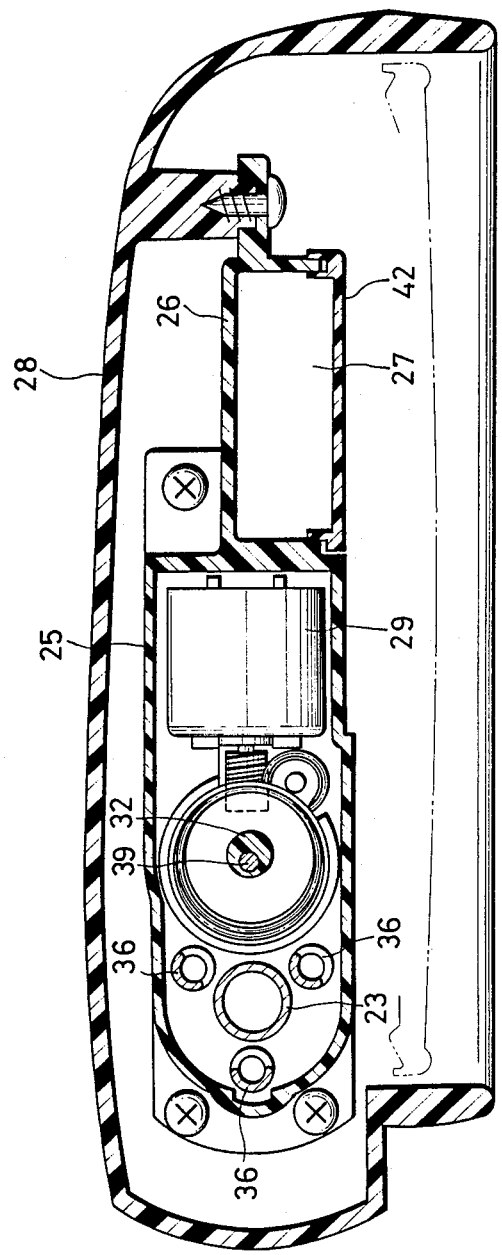
FIG. 2 is a sectional view taken along and seen in the direction of arrows II—II in FIG. 1.
Figure 3:
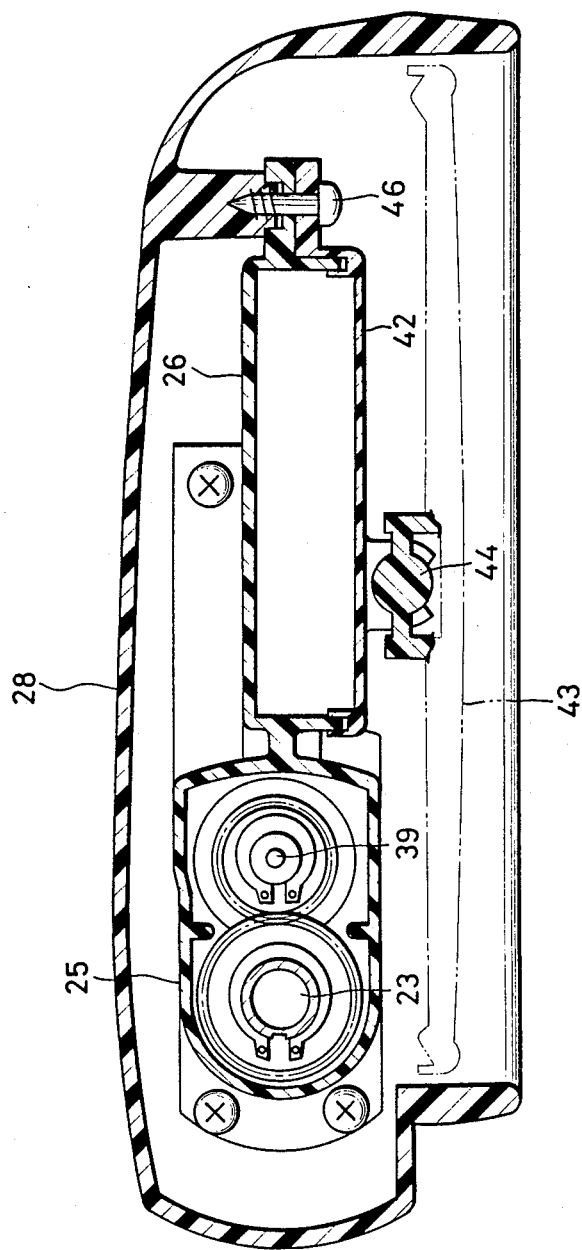
FIG. 3 is a sectional view taken along and seen in the direction of arrows III—III in FIG. 1.

Reference will be had to FIGS. 1 through 3. A base 22 formed at a lower part of a vehicle side member 21 is provided with a strut 23 in superposed fashion. A lower case 24 and an upper case 25 are supported on the strut 23, and the upper case 25 is integrally formed with a frame 26 which includes a mirror actuator unit 27. A mirror body 28 is fixed to the frame 26. The lower case 24 is supported about the lower side of the strut 23, and the upper case 25 about the upper side thereof. Arranged inside the cases 24, 25 are an electric motor 29, reduction gears or a so-called "2KV-V planetary gear train" composed of planetary gears having internal gears 30, 50, an external gear 31 and an eccentric gear 32, and springs 36. The driving gear 35 is keyed on the strut 23 and is prevented from slipping off in the upward direction by means of a ring. In addition, the driving gear 35 receives the biasing forces of the springs 36 through a plate 37 so as to check the downward movement thereof and raise the holding force of the cases 24, 25 for the base 22. The springs 36 also urge the lower case 24 toward the base 22. A ball 38 on the side of the lower case 24 is seated on a cam plate 37' on the side of the base 22.

As shown in FIG. 2, these springs 36 are arranged at equal intervals around the strut 23. This measure is effective to shorten the distance between the strut 23 and a first shaft 39.

When the motor 29 is energized, rotational motion about the horizontal axis of the motor 29 is converted into rotational motion about the vertical axis of the first shaft 39 by the use of a worm gear 40 and the like, and this rotational motion is transmitted to the eccentric gear 32. The rotation of the eccentric gear 32 having the eccentric shaft portion rotates the external gear 31 having e.g. (n−3) teeth. The external gear 31 is fixed to the lower case 24 and which is held in internal mesh with the internal gear 50 having (n−1) teeth about the internal gear 30 having n teeth. Eccentric gear 32 transfers the meshing point between the external gear 31 and the internal gear 30 in the circumferential direction thereof in succession. Thus, in one revolution of the eccentric gear 32, the internal gear 30 is shifted by one tooth, and the internal gear 30 is rotated about the first shaft 39 by one tooth with respect to the external gear 50 in accordance with the rotating direction of the motor 29. The decelerated rotation of the internal gear 30 is transmitted to the final gear 34 through the clutch 33. Since the driving gear 35 meshing with the final gear 34 is keyed to the strut 23, the rotation of the final gear 34 causes this gear 34 itself to revolve around the driving gear 35. Then, since both ends of the first shaft 39 are supported by the cases 24 and 25, the cases 24, 25, frame 26 and body 28 are unitarily turned around the strut 23. Numeral 41 denotes electric wires which causes currents to flow to the motor 29 and the actuator unit 27. As thus far described, even when a space as indicated by letter A is defined between the vehicle side member 21 and the mirror body 28 in order to prevent noise caused by the mirror assembly cutting through the air, the body driving device and the mirror actuator unit 27 can be arranged within the mirror body 28.

The upper case 25 has a substantially inverted U-shaped vertical section and extends sideward. Along with the lower case 24, the upper case 25 defines a space large enough to assemble the motor 29 and the reduction gears between both cases. The lower case 24 and the upper case 25 afford a sufficient holding portion for the strut 23 and provide a long holding span L2.

Since the reduction gears consisting of the planetary gears 30, 31 and 32 are disposed around the shaft 39 which is in juxtaposition with the strut 23, there is no obstacle to the extension of the strut 23 toward the upper case 25.

As seen in FIGS. 2 and 3, the frame 26, which is molded of a synthetic resin material so as to be integral with the upper case 25, is in the shape of a box having an open part. The open part of the frame 26 is closed by an upper housing 42, and the internal space thereof accommodates the mirror control actuator unit 27. Thus, the upper case, the frame and a lower housing in the prior art are unitarily molded in the present invention.

The frame 26 is fixed to the mirror body 28 by a screw 46 along with the upper housing 42 (refer to FIG.

Figure 4:
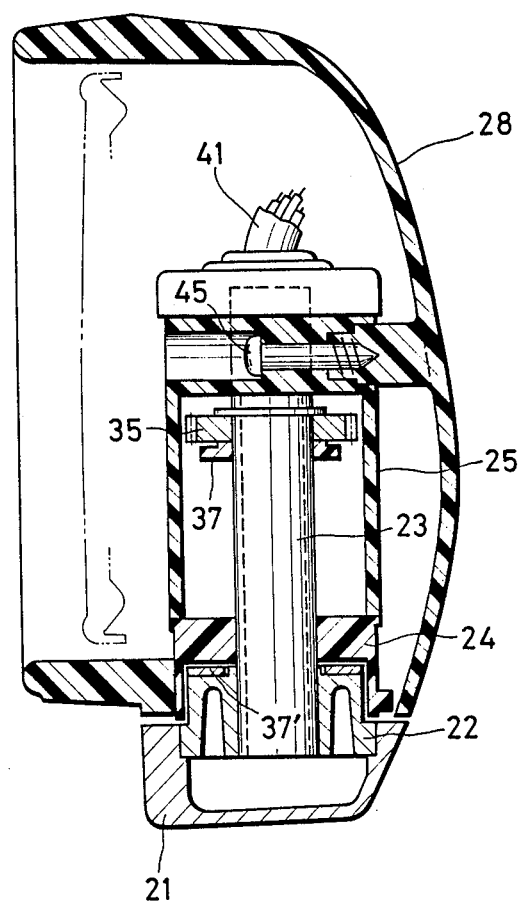
FIG. 4 is a sectional view taken along and seen in the direction of arrows IV—IV in FIG. 1.

3). As shown in FIG. 4, the upper case 25 is fixed to the mirror body 28 by a screw 45 at an upper part of the strut 23. Owing to these measures, an external force having acted on the mirror body 28 can be directly transmitted to the hollow strut 23. Since the strut 23 bears the respective cases 24 and 25 and the lower and upper parts thereof, it is capable of directly receiving the external force acting on the mirror body 28.

Due to the integral molding of the upper case 25, frame 26 and lower housing by the use of synthetic resin, the box-like frame 26 can be arranged substantially in the middle of the mirror assembly as viewed in the thickness direction thereof, and the supporting point 44 between a mirror 43 and the mirror control actuator unit 27 can be arranged at the central part of the mirror 43 close to the center of gravity of the mirror 43 itself.

Figure 5:
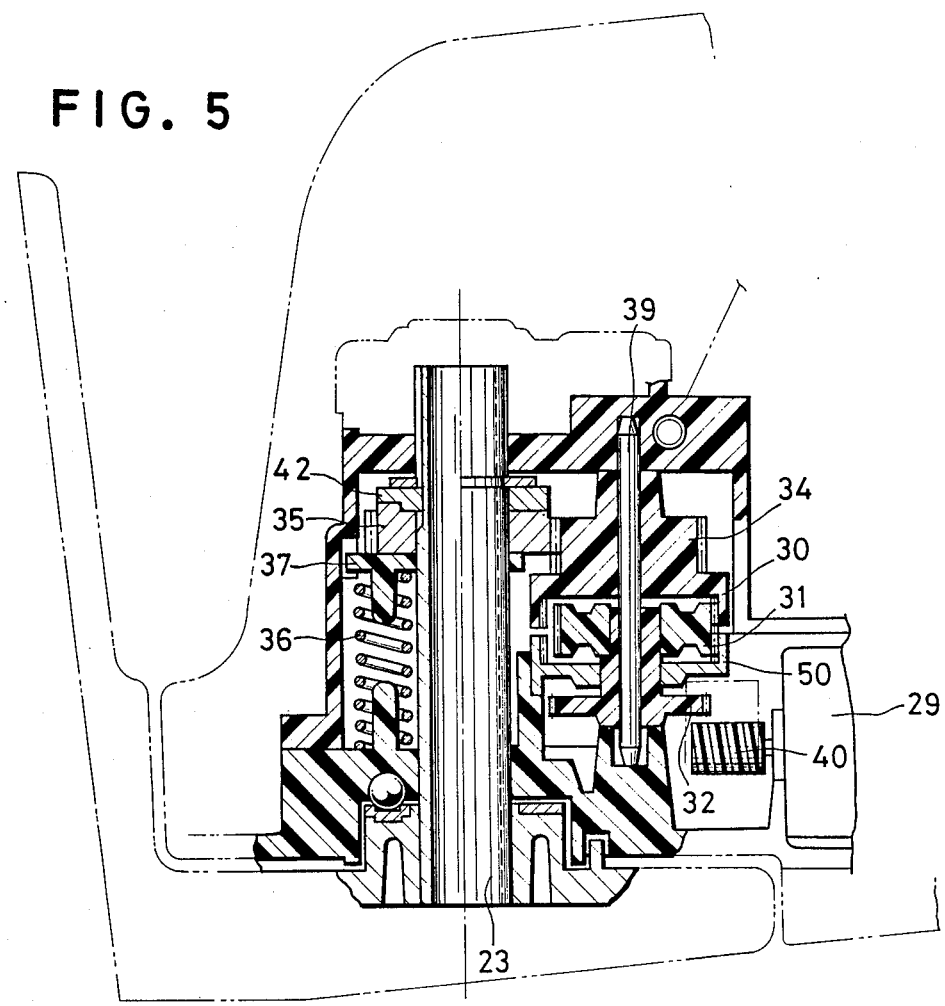
FIG. 5 is a partial sectional view showing another embodiment of the present invention.

An embodiment shown in FIG. 5 is such that, instead of the clutch 33 around the first shaft 39 (refer to FIG. 1), a torque limiter 42 is arranged around the strut 23. In this embodiment, the final gear 34 is formed integrally with the internal gear 30, and it is held in mesh with the driving gear 35 supported about strut 23. The driving gear 35 receives the biasing forces of the springs 36 and is held in engagement with the torque limiter 42 having a cam plate secured by a ring. Thus, unless a rotating torque greater than a predetermined magnitude acts on the driving gear 35, the latter is kept in fixed relationship with respect to the strut 23. As described in connection with FIG. 1, the rotation of the motor 29 is decelerated to 1/n rotation of the internal gear 30 through the eccentric gear 32, internal gear 50 and external gear 31. The decelerated rotation attempts to cause the final gear 34 to rotate the driving gear 35. However, since the driving gear 35 is fixed to the strut 23 by the torque limiter 42, the final gear 34 revolves around the driving gear 35 while revolving on its own axis. Thus, the mirror assembly is rotated about the strut 23 so as to change the position of the mirror. During the turning of the mirror assembly, the plate 37 slides relative to the driving gear 35. Moreover, even when the strut 23 and the cases 24, 25 have become frozen, a torque in excess of the predetermined magnitude acts on the driving gear 35 and the driving gear 35 is rotated relative to the strut 23 by the torque limiter 42. Thus, the mirror assembly is not rotated and an overload on the motor 29 is prevented.

Figure 6:
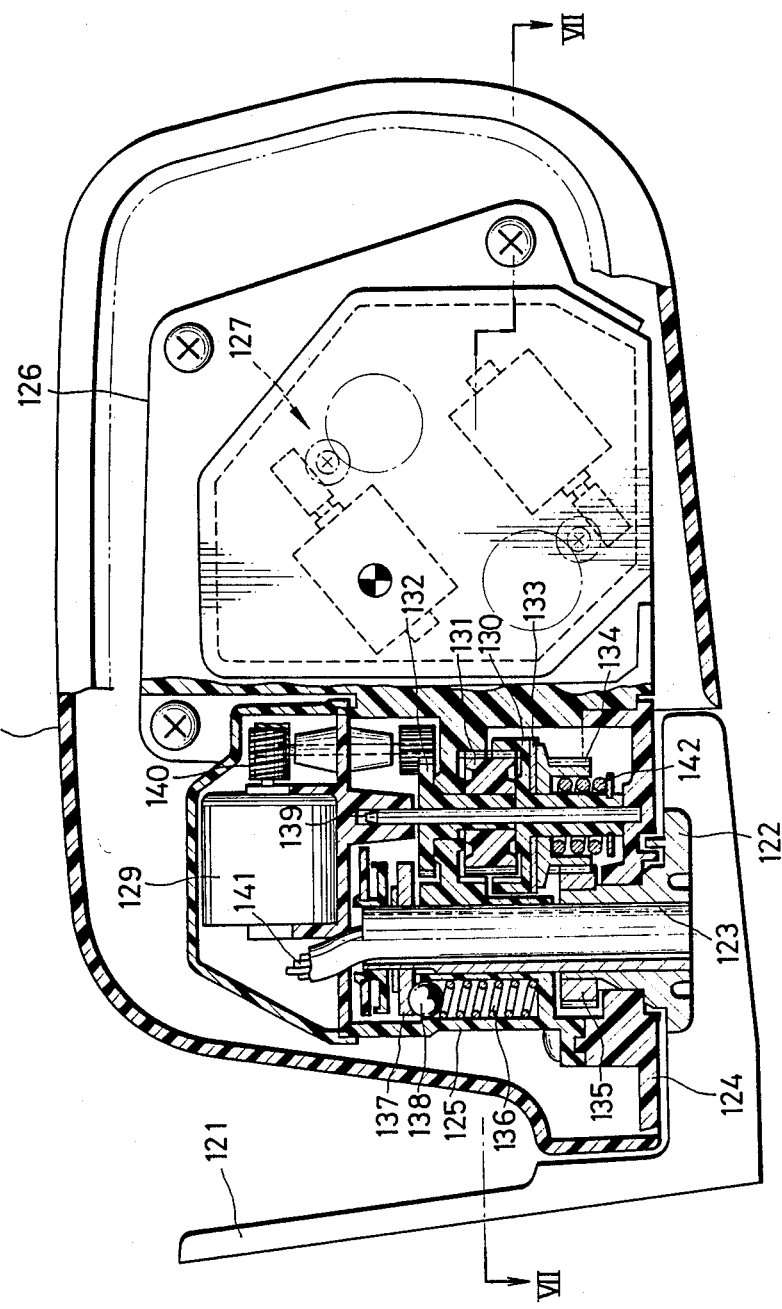
FIG. 6 is a sectional view of another embodiment of the present invention.
Figure 7:
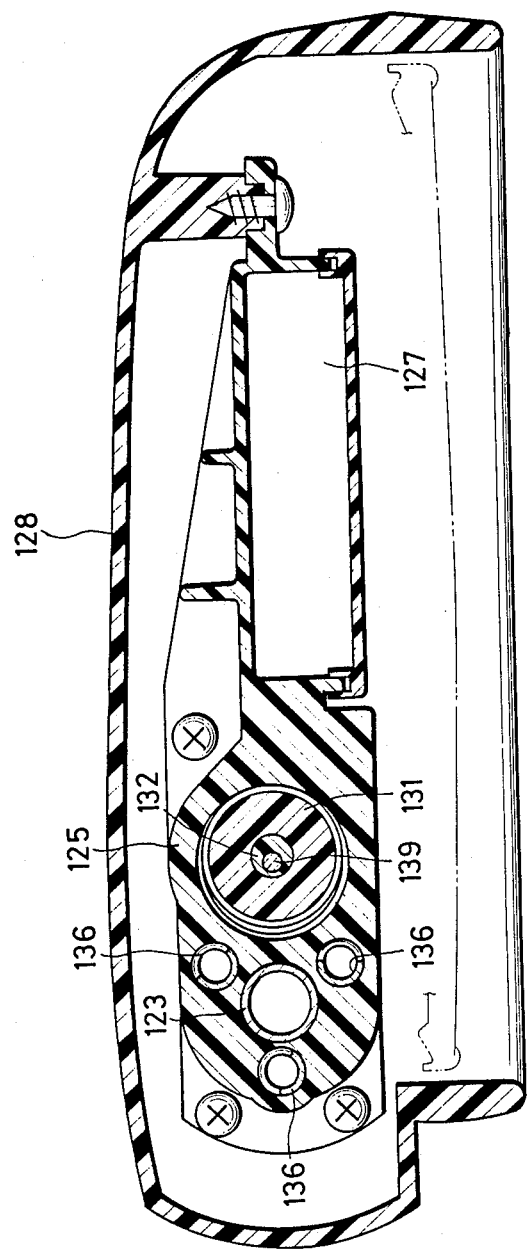
FIG. 7 is a sectional view taken along and seen in the direction of arrows VII—VII in FIG. 6.

FIGS. 6 through 9 show further embodiments of the present invention. Referring to FIGS. 6 and 7, a strut 123 is erected on a base 122 formed at a lower part of a vehicle side member 121. A lower case 124 and an upper case 125 are supported on the strut 123, and the upper case 125 is integrally formed with a frame 126 which includes a mirror actuator unit 127. A mirror body 128 is fixed to the frame 126. The lower case 124 is supported on the lower side of the strut 123, and the upper case 125 on the upper side thereof. Arranged inside the cases 124, 125 are an electric motor 129, reduction gears or a so-called "2KV-V planetary gear train" composed of planetary gears having internal gears 130, 150, an external gear 131 and an eccentric gear 132, and springs 136. The driving gear 135 is keyed on a lower part of the strut 123. A cam plate 137 is keyed on an upper part of the strut 123, and a ball 138 is pressed against the cam plate 137 by the first spring 136. The first spring 136 is received in a slot provided in the upper case 125. The final gear 134 is urged toward the torque limiter 133 by a second spring 142.

As shown in FIG. 7, three springs 136 are arranged at equal intervals around the strut 123. This measure is effective to shorten the distance between the strut 123 and a first shaft 139.

When the motor 129 is energized, rotational motion about the horizontal axis of the motor 129 is converted into rotational motion about the vertical axis of the first shaft 139 by the use of a worm gear 140 and the like. This rotational motion is transmitted to the eccentric gear 132. The rotation of the eccentric gear 132 having the eccentric shaft portion rotates the external gear 131 having e.g. (n−3) teeth, which is fixed to the lower case 124 and which is held in internal mesh with the internal gear 150 having (n−1) teeth, about the internal gear 130 having n teeth, and it transfers the meshing point between the external gear 131 and the internal gear 130 in the circumferential direction thereof in succession. Thus, in one revolution of the eccentric gear 132, the internal gear 130 is shifted by one tooth, and the internal gear 130 is rotated about the first shaft 139 by one tooth with respect to the external gear 150 in accordance with the rotating direction of the motor 29. The decelerated rotation of the internal gear 130 is transmitted to the final gear 134 through the torque limiter 133. Since the driving gear 135 meshing with the final gear 134 is keyed to the strut 123, the rotation of the final gear 134 causes the gear 134 itself revolving on its axis to revolve around the driving gear 135. Then, since both ends of the first shaft 139 are supported by the cases 124 and 125, the cases 124, 125, frame 126 and body 128 are unitarily turned around the strut 123. Numeral 141 denotes the electric wires which cause currents to flow to the motor 129 ad the actuator unit 127.

Thus, even when a space as shown by the letter A is defined between the vehicle side member 121 and the mirror body 128, the body driving device and the mirror actuator unit 127 can be arranged within the mirror body 128.

When the mirror assembly is turned about the strut 123, the springs 136 and the ball 138 are turned about the strut 123 along the upper case 125. When the ball 138 is transferred from one nodal hole to the next provided in the cam plate 137, only the ball 138 moves up and down, and the up-and-down motion is absorbed by the springs 136. Thus, the mirror assembly does not move vertically.

Figure 8:
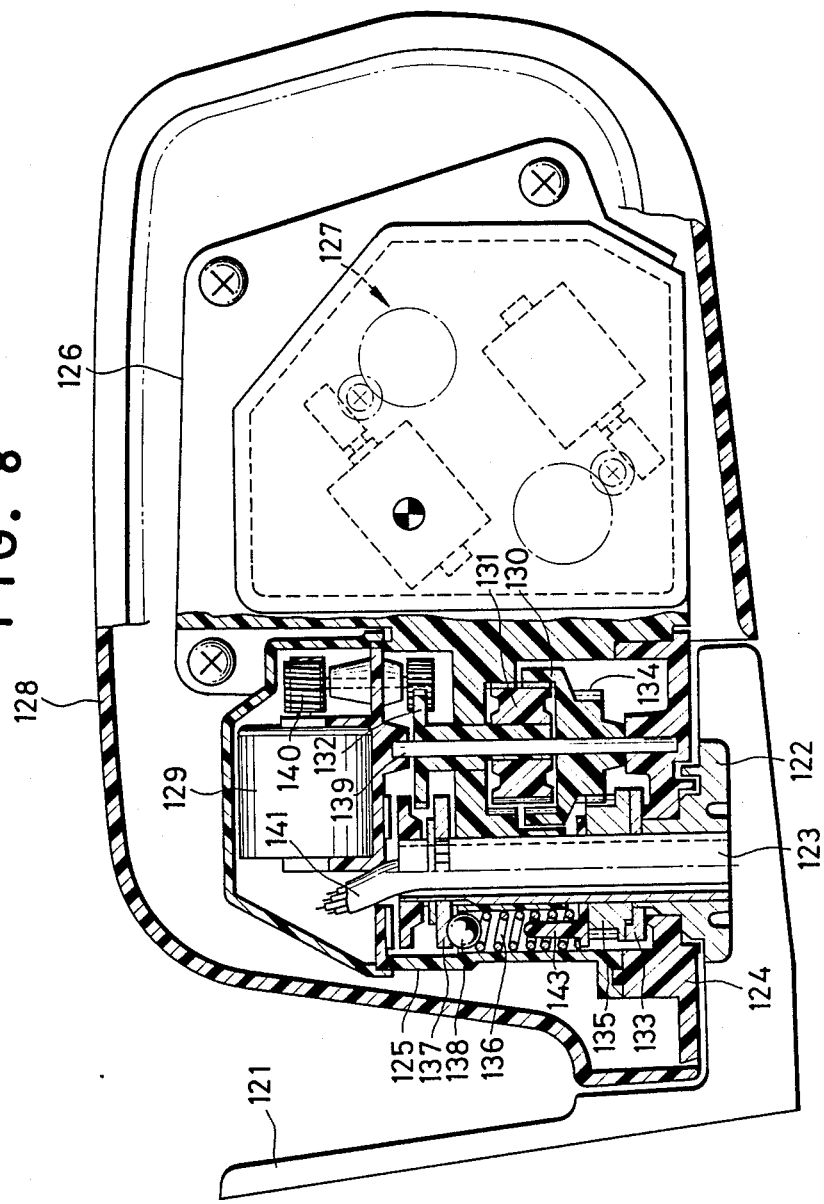
FIGS. 8 and 9 are sectional views each showing another embodiment.
Figure 9:
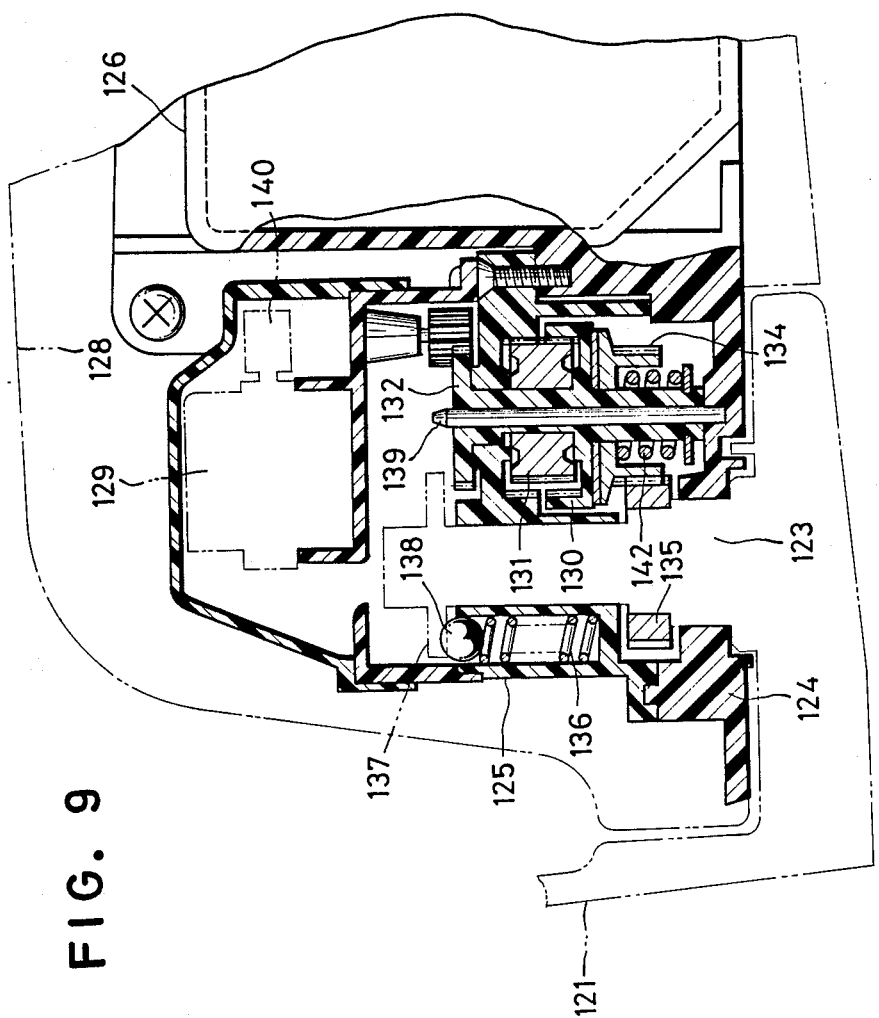
Figure 10:
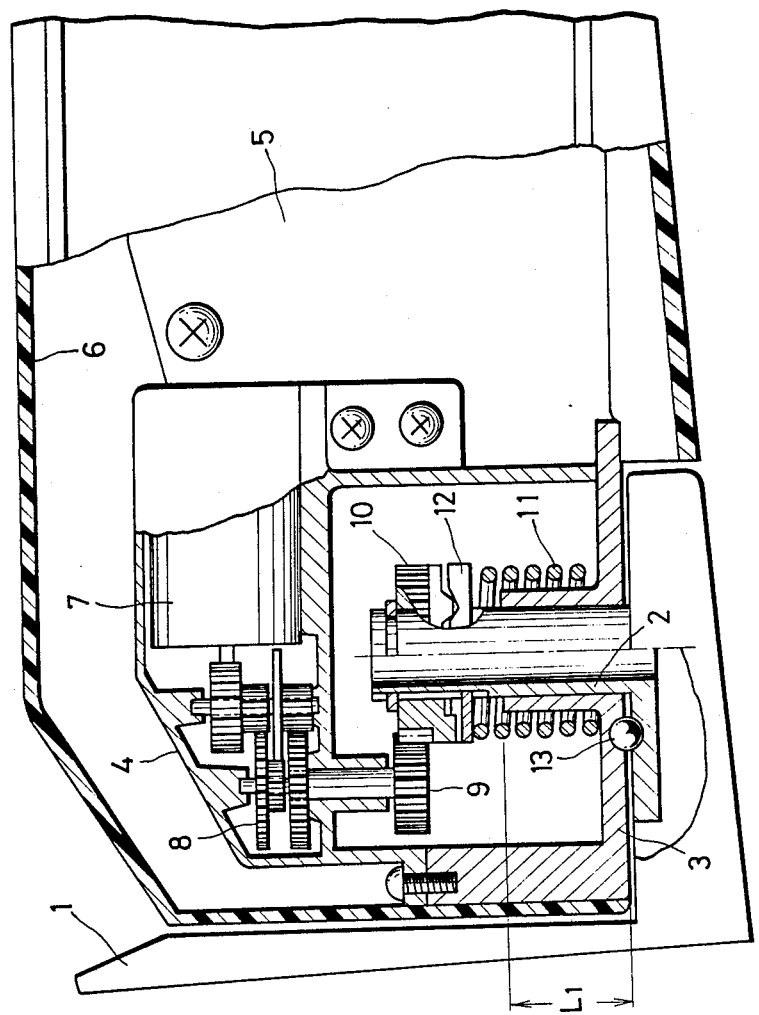
FIG. 10 is a sectional view showing a prior-art example.

In another embodiment of the present invention shown in each of FIGS. 8 and 9, the same elements as in the embodiment in FIGS. 6 and 7 are assigned identical symbols and shall be omitted from the description. The embodiment shown in FIG. 8 is such that the torque limiter 133 having a cam plate is interposed between the driving gear 135 and the lower case 124, and such that the lower ends of the first springs 136 are seated on a humped plate 143 which is turned along with the upper case 125. In the embodiment shown in FIG. 9, the lower case 124 and the frame 126 are integrally formed. In other aspects, the construction is the same as in the embodiment of FIGS. 6 and 7. The embodiments shown in FIGS. 8 and 9 perform the same operations as those of the embodiment of FIGS. 6 and 7.

According to the present invention, the holding span between a case assembly and a strut is long, so that a mirror body is capable of holding a proper attitude precisely without shaking relative to the strut. Moreover, the abutment between a ball and each concavity of a cam plate becomes uniform, and a stable nodal torque is attained.

Further, in the present invention, at least three springs are disposed at equal intervals. Therefore, the lower case is stably urged around the strut and is smoothly rotated without inclining relative to the strut.

In addition, reduction gears can be arranged in juxtaposition to the strut, so that the top wall of an upper case is permitted to overlie the strut. It is therefore possible for an upper part of the strut to be supported by the upper case so as to support both the upper and lower cases about the strut, whereby the case assembly is supported at two points on the strut. This aspect avoids twisting between the strut and the case assembly.

Further, the integral molding of the upper case, the frame and the lower housing makes it possible to set the supporting point of a mirror in the vicinity of the center of gravity of the mirror itself. Therefore, mirror vibration during traveling of the vehicle is prevented, and the clearance of the mirror from the case assembly and an upper housing for the required inclination of the mirror is reduced. As a result, the dimension of the mirror assembly in the thickness direction need not be large.

Still further, in the present invention, the final gear of the reduction gears and a driving gear for the strut are arranged on the lower case side. Therefore, the supporting span between the upper case and the strut can be lengthened to prevent rattling of the mirror assembly during the turning thereof. A part of an internal gear is provided in the upper case, and an external gear is held in mesh with the part of the internal gear. Since the part of the internal gear can be molded simultaneously with the upper case, the mirror assembly is inexpensive and ease to assemble.

As many apparently widely different embodiments of the present invention can be made without departing from the spirit and scope thereof, it is to be understood that the invention is not limited to the specific embodiments thereof except as defined in the appended claims.

What is claimed is:

1. An assembly for supporting a door mirror of an automotive vehicle comprising:
    a lower case supported about a strut of a vehicle side member;
    an upper case fixed to said lower case;
    a motor and reduction gears accommodated within a space defined by said lower and upper cases;
    a driving gear which meshes with a final gear of said reduction gears and which is held about said strut; and
    a spring for biasing said driving gear upward and said lower case downward;
    said upper case being supported about an upper portion of said strut, and a case assembly consisting of said lower case and said upper case being supported along at least two axes relative to said strut.

2. An assembly according to claim 1, wherein a shaft for supporting said final gear has its upper and lower ends supported by said upper case and said lower case respectively and is held in parallel with said strut.

3. An assembly according to claim 2, wherein at least three springs are arranged at equiangular positions around said strut, and wherein a line connecting the axes of two of said springs is substantially orthogonal to a line connecting the axes of said strut and said shaft.

4. An assembly for an automotive vehicle comprising:
    a lower case supported about a strut of a vehicle side member;
    an upper case fixed to said lower case;
    a motor and reduction gears accommodated in a space inside both of said cases;
    a driving gear which meshes with a final gear of said reduction gears and which is held about said strut;
    a spring which biases the lower case downward; and
    a ball which undergoes a biasing forces of said spring pressed against said vehicle side member;
    a lower end of said spring being seated on a lower part of said upper case, while said ball is seated on an upper end of said spring so as to be pressed against a cam plate fixed to an upper part of said strut, whereby only said ball is moved up and down relative to said cam plate during turning of said cases.

5. An assembly for supporting a door mirror of an automotive vehicle, comprising:
    a strut extending from a vehicle;
    a case assembly including a lower case rotatably supported about a lower portion of said strut and an upper case fixed to said lower case and rotatalby supported about an upper portion of said strut;
    means for supporting said case assembly along a plurality of axes relative to said strut;
    a motor and reduction gear assembly including a final gear disposed within a compartment defined by said case assembly;
    a driving gear mounted on said strut and drivingly engaged with said final gear said final gear transmitting the rotation of said motor to the driving gear of said strut through said reduction gear assembly;
    means for biasing said driving gear and said lower case in opposing axial directions.

6. An assembly of claim 5, wherein said means for supporting said case assembly includes a shaft disposed parallel to said strut for supporting said final gear, said shaft being supported at one end by the upper case and at the other end by the lower case.

7. An assembly of claim 6, wherein said means for biasing said driving gear and said lower case in opposing axial directions includes at least three springs disposed at equiangular positions around said strut, each said spring seated at one end on said lower case and at the other end on a plate adjacent the driving gear for biasing the lower case and driving gear in opposing axial directions.

8. An assembly of claim 7, wherein each of said three springs is disposed away from an area between the strut and the shaft for minimizing the required distance between the strut and the shaft.

9. An assembly of claim 6, said door mirror assembly further including a frame assembly having a mirror body attached thereto, said frame assembly being integrally formed with said upper case.

10. An assembly of claim 6, said door mirror assembly further comprising a ball disposed in said upper case between a cam plate mounted on said strut and having indentations adapted to receive the ball and a spring biasing said ball against said cam plate, the spring being supported at one end by a lower portion of the upper case, wherein as the upper case rotates the ball moves in and out of said indentations, said movement of the ball being absorbed by said spring without axially moving said upper and lower cases.

11. An assembly of claim 9, wherein said frame assembly defines a first portion of a housing for accommodating a mirror control unit to control the mirror body.

12. An assembly of claim 11, wherein said mirror control unit housing further includes a second housing portion fixed to the first housing portion defined by said frame, said first and second housing portions defining a space for accommodating said mirror control unit.

13. An assembly of claim 12, wherein said upper case is fixed to said mirror body and wherein said first and second mirror control housing portions are fixed to said mirror body.

* * * * *